US006244567B1

United States Patent
Robbins

(12) United States Patent
(10) Patent No.: US 6,244,567 B1
(45) Date of Patent: Jun. 12, 2001

(54) SEGMENTED SEAT RETAINER FOR VALVES

(75) Inventor: Norm L. Robbins, La Canada, CA (US)

(73) Assignee: Val-Matic Valve & Manufacturing Corp., Elmhurst, IL (US)

(*) Notice: Subject to any disclaimer, the term of this patent is extended or adjusted under 35 U.S.C. 154(b) by 0 days.

(21) Appl. No.: 09/450,421

(22) Filed: Nov. 30, 1999

(51) Int. Cl.⁷ .................... F16K 1/22; F16K 5/00
(52) U.S. Cl. .......................... 251/306; 251/314
(58) Field of Search ...................... 251/306, 314, 251/316, 317, 317.01

(56) References Cited

U.S. PATENT DOCUMENTS

| | | | |
|---|---|---|---|
| 1,635,407 | * 7/1927 | Grover | 251/306 |
| 3,544,066 | 12/1970 | Fawkes. | |
| 3,633,872 | * 1/1972 | Wright | 251/306 |
| 3,784,215 | * 1/1974 | Ruthenberg | 251/306 |
| 4,105,040 | * 8/1978 | Chester | 251/306 |
| 4,377,181 | * 3/1983 | Chan | 251/306 |
| 4,944,489 | 7/1990 | Adams et al. . | |
| 5,377,954 | 1/1995 | Adams et al. . | |
| 5,538,029 | 7/1996 | Holtgraver. | |
| 5,934,680 | * 8/1999 | Kakehi et al. | 251/306 |

OTHER PUBLICATIONS

American–Darling Butterfly Valves brochures, Rev. Mar. 1992.

* cited by examiner

Primary Examiner—Kevin Shaver
Assistant Examiner—David A. Bonderer
(74) Attorney, Agent, or Firm—Sonnenschein Nath & Rosenthal

(57) ABSTRACT

A retaining ring for a resilient valve seat carried on a movable valve member is provided in a plurality of segments which may be cast in an investment casting method. The ring segments may be identical in shape and may overlap one another, with threaded fasteners securing the ring segments to the valve member. Concentric grooves may be provided on a face of the ring segments which engage the resilient valve seat to prevent its movement or displacement relative to the valve member.

12 Claims, 3 Drawing Sheets

SEGMENTED SEAT RETAINER FOR VALVES

BACKGROUND OF THE INVENTION

Field of the Invention

The present invention relates generally to resilient seated valves such as butterfly valves and more specifically to valves with resilient seats fastened to the closure member with a retaining ring.

Valves with resilient seats have been commonly used in the water and wastewater systems to control flow in such systems. The nature of the resilient seat allows the valve to provide a zero leakage seal under normal operating conditions. The tight seal is provided by a set interference between the resilient material and the corrosion resistant mating surface. The resilient seal can be located on either the outside diameter of the closure member or the inside of the body shell which will mate against an opposing corrosion resistant sealing surface that can be either an integral part or fastened to the valve.

By its natural properties, a resilient seal will flex and flow under pressure to fill gaps or worn grooves in the mating sealing surface. Because valves when installed are subject to wear and deflection in service, an important feature of resilient seated valves is their ability to be adjusted or replaced in the pipeline or piping system. Butterfly valves having an economical and easily adjustable or replaceable seat are of great value to the owner of the piping system.

One type of resilient seated valve is disclosed in U.S. Pat. No. 3,544,066, wherein the resilient seat is contained in a triangular shaped slot or groove in the valve body. Adjustment is accomplished by injecting an epoxy material behind the seat to deflect the rubber outward toward the sealing surface on the outside diameter of the disc. Such adjustment requires special injection pots, chemicals, needles, and piping. Practice has shown that great skill is needed to make adjustments under field conditions. An improvement in this design is disclosed in U.S. Pat. No. 5,538,029, where a polymeric injection is used from the outside of the valve. Given that the original epoxy is set, a future injection at a later date may be ineffective in moving the resilient seat in the intended direction. In both designs, replacement of the seat requires removal of the old seat with chisels and other sharp objects, followed by a new epoxy injection with a new resilient seat. The materials and equipment to accomplish this task are not readily available and must be purchased or shipped to the job site a great expense and time.

A more practical design, and one which has been commonly employed for many decades is shown in U.S. Pat. No. 4,944,489, where the flexible seat of the valve is secured to the closure member with a retaining ring which is held to the closure member by a circle of threaded fasteners. Another design is illustrated in the American Butterfly Valve literature which shows a solid stainless steel ring intended for corrosive service. The clear practicality of this design is that adjustment or replacement of the seat requires just a simple hand wrench which can be found in any tool box. This method is quite common and used in many valves. However, in water service, the cost of materials, and most specifically the retaining ring, becomes extremely high because of the need for a corrosion resistant alloy such as Type 316 stainless steel. When the retaining ring is fabricated from a plate, the vast majority of the material (that material in the center of the ring) becomes waste. Further, because of the low stiffness of the part due to its shallow thickness, narrow width, and large diameter, extreme care is needed to fabricate the part and maintain the necessary precision. When a large thin ring is machined, internal stresses cause the part to bend or bow when it is removed from the restraint of the mill or lathe. Further thermal processing and straightening processes are often necessary to produce a flat, concentric, and useful part.

Retaining rings have been segmented as disclosed in U.S. Pat. No. 5,377,954. The purpose of these segments is to allow the ring to be assembled into an exterior groove, not to improve the manufacturability of the ring. This ring is likely still made in one large ring and then cut into the segments shown.

There is a need for a ring that provides for easy adjustment and replacement of the resilient seat. The ring must also provide sure and fast retainment of the resilient seat, even under extreme flow rate and pressure conditions. Finally, use has shown that a bolted retainer ring is desirable to achieve these features. However, the difficulties of its manufacture make it cost prohibitive in general water applications. An improved retainer ring must therefore be simple and economical to manufacture while providing the aforementioned performance features.

SUMMARY OF THE INVENTION

The purpose of the present invention is to provide a method of and apparatus for resilient seat retention that is effective in allowing easy adjustment and replacement of the resilient seat by using a bolted retaining ring. The key feature of the invention is the segmentation of the retaining ring, the use of a ridged surface to retain the seat, and the combination of locking fasteners and shouldered surfaces to further retain the seat. Each adjustment or replacement is accomplished by the use of hexagonal headed fasteners.

Economical manufacture is provided by segmentation of the retaining ring. Segmentation reduces the overall dimension of the parts to a few inches which allows for casting of the part in precious alloys using the investment casting process. Investment casting tooling is very expensive and not practical for parts over several inches in size such as a 30 inch diameter retaining ring. Although the investment casting process involves costly tooling, the process provides the necessary precision (i.e. to within 5 thousandths of an inch) so that the part can be used in the as-cast condition without additional machining. Also, because of the reduced overall dimension, flatness is not as critical because the assembly of the segments will automatically compensate for any loss of flatness.

Previous designs have a solid ring that has been cut or segmented radially into several sections. The sections therefore have gaps between them which allow cold flow of the resilient material between the segments which can cause valve leakage. The ends of the segments are also cantilevered in traditional designs and can deflect upward at the segment joints causing an uneven compression on the rubber seat. The improved design of the present invention has segments with an overlap section across a bolt connection with both sections (or tabs) designed with equal rigidity. The use of an overlap in the segments provides continuity in the ring and retention properties equal to that of a one-piece circular ring. With the improved ring, the gaps between adjacent segments can be minimized. The overlap also assures that the surface in contact with the resilient material is flat and provides a uniform contact pressure on the resilient material. Contact pressure is essential for retention of the seat under flowing conditions.

The retention is further enhanced by a set of concentric grooves in the face of the retaining ring segments. The raised portions of the surface become embedded into the resilient material and prevent the seat from being forced outward radially by the pressure or flow forces. A shoulder is also provided on the ring to match the opposite shoulder on the resilient seat to positively lock the resilient material in place. Finally, the threaded fasteners pass through the center of the segment and the resilient seat to provide additional retention. The fasteners are drilled and filled with a nylon rod to provide thread friction and prevent the fastener from rotating loose from vibration.

A further feature of the improved ring is that the axial flexibility of the ring allows local adjustment of the resilient seat without unloading adjacent bolts. When a solid ring is adjusted in a local area, the adjacent bolts lose their compression on the resilient seat and must be retightened. Since the extra rubber interference is only needed in one small area, a larger portion of the resilient seat may be over stressed. A segmented ring provides a more local control and retention of the resilient seat.

BRIEF DESCRIPTION OF THE DRAWINGS

The present invention is illustrated more or less diagrammatically in the accompanying drawings, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENTS

Figure 1:
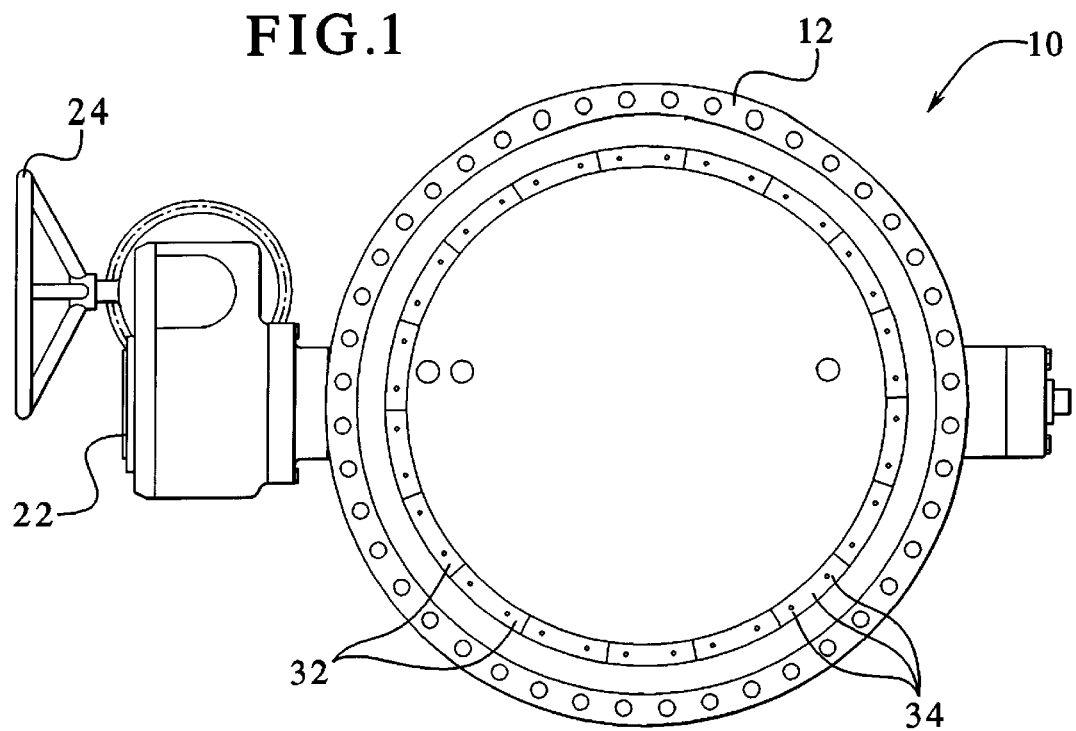
FIG. 1 is an elevational view of a valve body, valve disc and segmented retaining ring made in accordance with the present invention.
Figure 2:
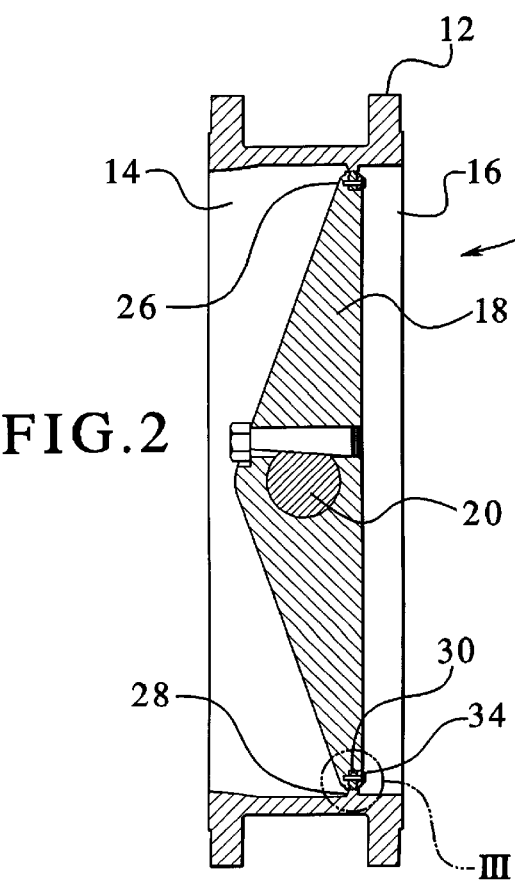
FIG. 2 is a side sectional view of the valve body, valve disc and retaining ring of FIG. 1.
Figure 3:
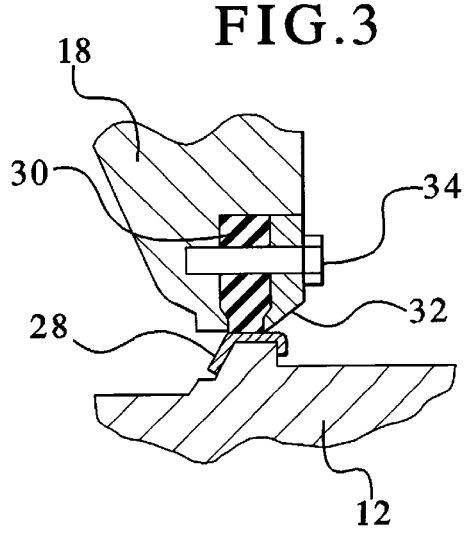
FIG. 3 is an enlarged partial view of the valve disc and retaining ring as indicated at III in FIG. 2.
Figure 4:
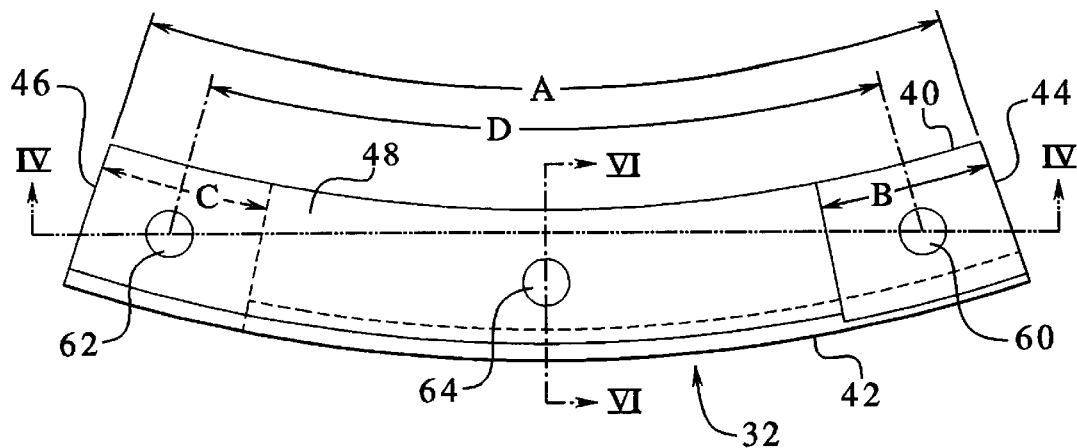
FIG. 4 is a plan view of a ring segment made in accordance with the present invention.
Figure 5:
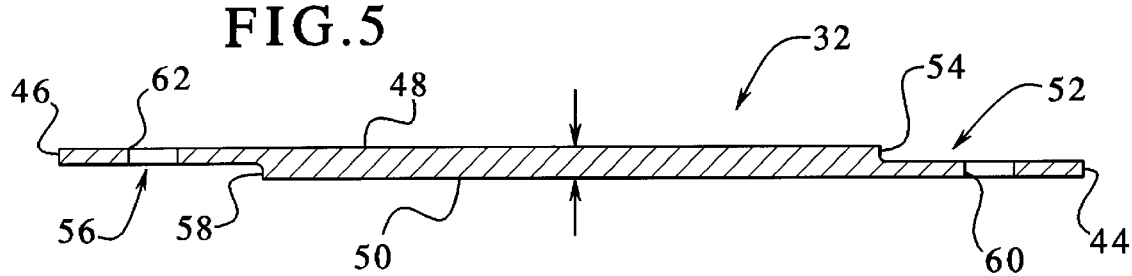
FIG. 5 is a side sectional view of the ring segment taken generally along the line V—V of FIG. 2.
Figure 6:
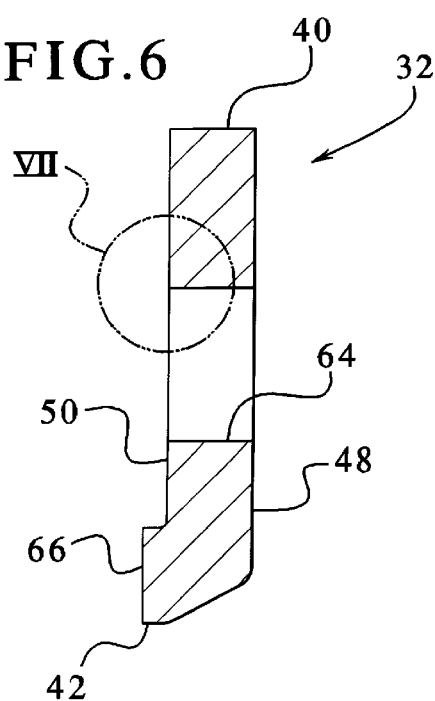
FIG. 6 is a side sectional view of the ring segment taken generally along the line VI—VI of FIG. 2.
Figure 7:
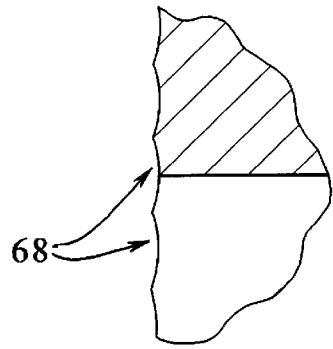
FIG. 7 is an enlarged partial view of a portion of the ring segment as indicated at VII in FIG. 5.
Figure 8:
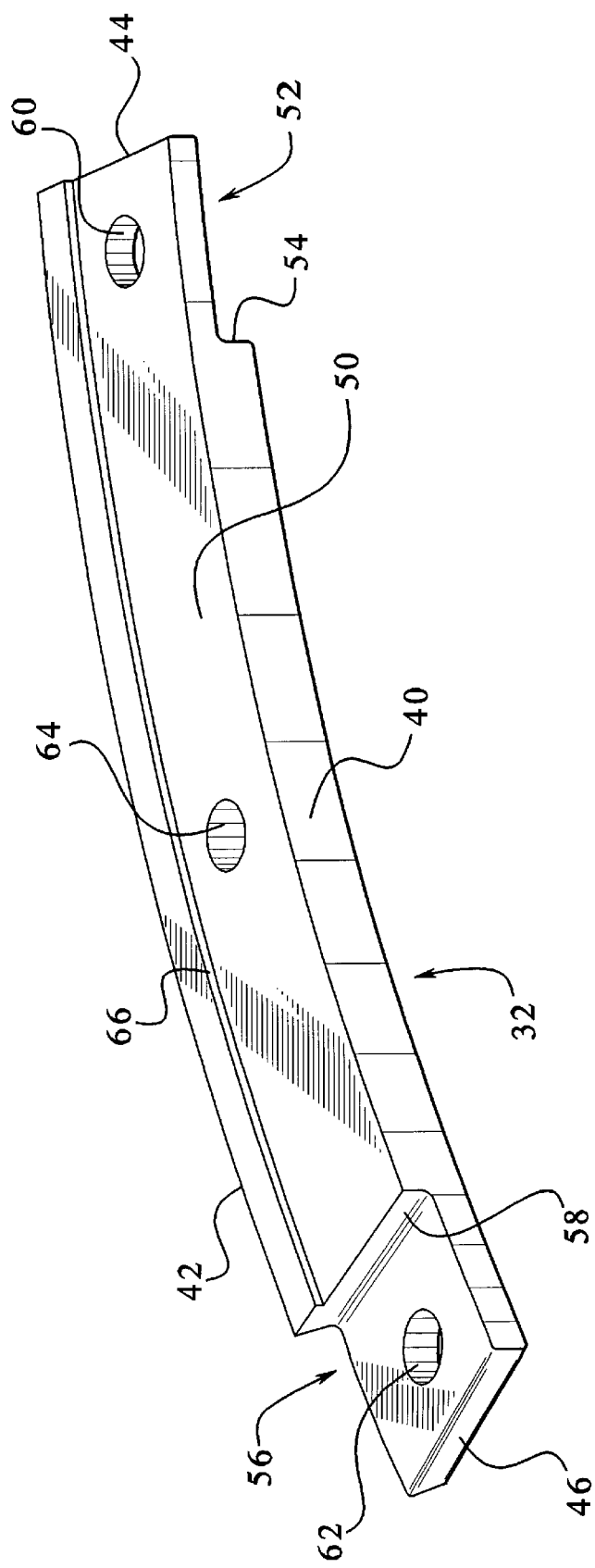
FIG. 8 is a perspective view of the ring segment of FIG. 3 showing the rear face.

In FIGS. 1 and 2 there is illustrated a valve 10, such as a butterfly valve, in which there is a valve body 12 having an inlet side 14 and an outlet side 16 and defining a flow path therebetween. The valve 10 further comprises a movable valve member 18 which is shown in the form of a butterfly valve disk carried on a central axle 20 for pivoting movement. An actuator 22 which may be operated by a hand crank 24 or by mechanized means is used to rotate the valve member 18 between an open and closed position. In the closed position, as illustrated in FIGS. 2 and 3, a peripheral edge 26 of the valve member 18 engages against a valve body seat ring 28. A resilient disk seat ring 30 is held onto the movable valve member 18 by a plurality of ring segments 32 which are secured to the valve member 18 by threaded fasteners 34.

The ring segments 32 are shown in greater detail in FIGS. 4–8 wherein only one ring segment 32 is illustrated in that in the preferred embodiment, all of the ring segments are identical to each other.

The ring segment 32 comprises a flat arcuate member having an inner edge 40 formed as an arc of a first radius from a center point (not shown), an outer edge 42 formed as an arc of a second, greater radius from the same center point, a first end 44 formed as a segment of a line which radiates from the center point, the line segment extending from the inner edge 40 to the outer edge 42, and a second end 46 formed as a segment of a second line radiating from the same center point, the second line segment extending from the inner edge 40 to the outer edge 42. The first end 44 and second end 46 are angularly spaced from one another by an angle A. The ring segment 32 has a front face 48 extending between said inner edge 40 and said outer edge 42 and from said first end 44 to said the second end 46. The ring segment also has a rear face 50 extending between the inner edge 40 and the outer edge 42 from the first end 44 to the second end 46 and which is spaced by a thickness T from the front face 48.

The front face 48 has a recessed area 52 at the first end 44 comprising half of the thickness T. The front face recessed area 52 extends from the inner edge 40 to the outer edge 42 and from the first end 44 to a shoulder 54 which forms a segment of a third line radiating from the center point, the third line segment being angularly spaced from the first end by an angle B which is less than half of angle A.

The rear face 50 has a recessed area 56 at the second end 46 comprising half of the thickness T. The rear face recessed area 56 extends from the inner edge 40 to the outer edge 42 and from the second end 46 to a shoulder 58 which forms a segment of a fourth line radiating from the center point. The fourth line segment is angularly spaced from the second end 46 by an angle C which preferably is identical to angle B and also is less than one half of angle A.

In each of the recessed areas 52, 56 there is a through hole 60, 62 and a third through hole 64 may also be provided at the mid point of the length of the ring segment 32. The through holes 60, 62 and 64 are provided for receiving the threaded fastener 34 used to secure the ring segments 32 to the valve member 18. Preferably the threaded fastener is in the form of a threaded nylon rod with a hexagonal head.

The ring segment 32 also has an arcuate shoulder 66 formed along the outer edge 42 and projecting above the rear face 50. The surface of the rear face 50, which is to engage the resilient disk seat 30, is provided with a series of grooves 68 shown in detail in FIG. 7. Preferably the grooves are concentric with the inner edge 40 and outer edge 42.

The ring segments 32 are to be assembled in adjoining and overlapping fashion such that the rear face recessed area 56 will overlie an adjacent front face recessed area 52 permitting through hole 62 to align with through hole 60 such that a single fastener will pass through two segments to secure the two segments relative to one another and to the valve member 18. On each individual segment 32 the through hole 60 in the front face recessed area 52 is angularly spaced from the through hole 62 in the rear face recessed area 56 by an angle D. The angle D is to be selected such that it may be multiplied by an integer to equal 360°. That is, a plurality of identical ring segments 32 could then be arranged in overlapping fashion to precisely complete a full circular ring.

The rear face 50 is to be engaged against the resilient disk seat 30 and the shoulder 66 and groove 68 will prevent the seat from being forced outward radially by a pressure or flow forces.

As is apparent from the foregoing specification, the invention is susceptible of being embodied with various alterations and modifications which may differ particularly from those that have been described in the preceding specification and description. For example, the ring segments can be used on a moveable valve member other than a butterfly valve disk. Further, although generally valves have a circular movable member, if the resilient seat is other than circular, the ring segments will also form a non-circular ring that conforms to the perimeter of the resilient seat. It should be understood that I wish to embody within the scope of the patent warranted hereon all such modifications as reasonably and properly come within the scope of my contribution to the art.

I claim as my invention:

1. A valve comprising:
   a valve body comprising an inlet and an outlet and defining a flow path therebetween,
   a movable valve member with a resilient valve seat carried thereon for selectively engaging a portion of said valve body to close said flow path; and
   a retaining ring formed as a series of overlapping segments, for holding said valve seat against said valve member.

2. A valve according to claim 1, wherein said segments are secured to said valve member by means of threaded fasteners extending through holes in the overlapping portions of said segments.

3. A valve according to claim 2, wherein said threaded fasteners are made from a nylon rod with a hexagonal head.

4. A valve according to claim 1, wherein said segments include grooves formed in a face thereof which engages said resilient valve seat.

5. A valve according to claim 1, wherein said segments each have a shoulder formed thereon, and said resilient valve seat has a complementary shoulder formed thereon, said shoulders abutting when said segments are secured to said valve member against said valve seat.

6. A valve comprising:
   a valve body comprising an inlet and an outlet and defining a flow path therebetween;
   a movable valve member and a resilient valve seat carried thereon; and
   a retaining ring formed as a series of identically shaped segments, for holding said valve seat against said valve member.

7. A valve according to claim 6, wherein said segments are arcuately shaped, with a rear face for engaging said resilient valve seat and an opposite front face, one end of said front face having a recessed area and the opposite end of said rear face having a recessed area, such that adjacent segments will overlap each other in said recessed areas.

8. A valve according to claim 7, wherein a thickness of said segment at said front face recessed area is the same as a thickness of said segment at said rear face recessed area.

9. A valve according to claim 6, wherein said segments are secured to said valve body by means of threaded fasteners extending through holes in the overlapping areas of said segments.

10. A valve according to claim 9, wherein said threaded fasteners are made from a nylon rod with a hexagonal head.

11. A valve according to claim 6, wherein said segments include grooves formed in a face thereof which engages said resilient valve seat.

12. A valve according to claim 6, wherein said segments each have a shoulder formed therein, and said resilient valve seat has a complementary shoulder formed thereon, said shoulders abutting when said segments are secured to said valve member against said valve seat.

* * * * *